United States Patent
Nagata et al.

(10) Patent No.: US 11,976,838 B2
(45) Date of Patent: May 7, 2024

(54) AIR-CONDITIONING APPARATUS

(71) Applicant: Mitsubishi Electric Corporation, Tokyo (JP)

(72) Inventors: Ryuichi Nagata, Tokyo (JP); Masanori Sato, Tokyo (JP); Yusuke Tashiro, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/773,376

(22) PCT Filed: Jan. 7, 2020

(86) PCT No.: PCT/JP2020/000164
§ 371 (c)(1),
(2) Date: Apr. 29, 2022

(87) PCT Pub. No.: WO2021/140564
PCT Pub. Date: Jul. 15, 2021

(65) Prior Publication Data
US 2022/0397301 A1    Dec. 15, 2022

(51) Int. Cl.
*F24F 11/74* (2018.01)

(52) U.S. Cl.
CPC .................. *F24F 11/745* (2018.01)

(58) Field of Classification Search
CPC .... F24F 11/745; F24F 1/0007; F24F 2120/12; F24F 11/77; F24F 11/80; F24F 2110/10; Y02B 30/70
See application file for complete search history.

(56) References Cited

U.S. PATENT DOCUMENTS

| | | | |
|---|---|---|---|
| 5,467,606 A | 11/1995 | Sasaki et al. | |
| 2020/0049358 A1* | 2/2020 | Suciu | F24F 11/79 |
| 2021/0055025 A1* | 2/2021 | Tsukiyama | F25B 39/00 |
| 2022/0235961 A1* | 7/2022 | Tanaka | F24F 11/84 |

FOREIGN PATENT DOCUMENTS

| | | |
|---|---|---|
| EP | 3 282 198 A1 | 2/2018 |
| EP | 3 511 639 A1 | 7/2019 |
| EP | 3 521 716 A1 | 8/2019 |
| JP | H05-060365 A | 3/1993 |

(Continued)

OTHER PUBLICATIONS

Machine Translated Annotated Description of Tsukiyama(JP2015152281A), Aug. 24, 2015, Espacenet Patent Search. (Year: 2015).*

(Continued)

*Primary Examiner* — Nelson J Nieves
*Assistant Examiner* — Matthew John Moscola
(74) *Attorney, Agent, or Firm* — POSZ LAW GROUP, PLC

(57) ABSTRACT

An air-conditioning apparatus includes a casing provided with an air inlet through which air is sucked and an air outlet through which the air is blown out, heat exchangers being connected in parallel, and causing heat exchange to be performed between the air sucked from the air inlet and refrigerant, fans each sending the air to a corresponding one of the heat exchangers, and a controller. The controller controls the fans so that they have different rotational speeds.

3 Claims, 8 Drawing Sheets

(56) References Cited

FOREIGN PATENT DOCUMENTS

| | | |
|---|---|---|
| JP | H06-137644 A | 5/1994 |
| JP | 2000-320882 A | 11/2000 |
| JP | 2012-037172 A | 2/2012 |
| JP | 2015-152281 A | 8/2015 |
| JP | 2018-025344 A | 2/2018 |
| WO | 2018/061188 A1 | 4/2018 |

OTHER PUBLICATIONS

Office Action dated Feb. 7, 2023 issued in corresponding JP patent application No. 2021-569630 (and English machine translation).
International Search Report of the International Searching Authority dated Feb. 25, 2020 for the corresponding International application No. PCT/JP2020/000164 (and English translation).
Extended European Search Report dated Nov. 28, 2022 issued in corresponding EP Patent Application No. 20912913.9.
Office Action dated Sep. 12, 2023 issued in corresponding JP Patent Application No. 2021-569630 (and English translation).
Office Action dated Dec. 6, 2023 issued in corresponding CN Patent Application No. 202080091586.0 (and English translation).

\* cited by examiner

US 11,976,838 B2

AIR-CONDITIONING APPARATUS

CROSS REFERENCE TO RELATED APPLICATION

This application is a U.S. national stage application of International Patent Application No. PCT/JP20209/000164 filed on Jan. 7, 2020, the disclosure of which is incorporated herein by reference.

TECHNICAL FIELD

The present disclosure relates to an air-conditioning apparatus that performs air conditioning of an indoor space.

BACKGROUND

Hitherto, an indoor unit of an air-conditioning apparatus capable of performing dual temperature air conditioning in which air having two different temperatures is separated and blown out at the same time is known (for example, see Patent Literatures 1 and 2). For example, in Patent Literature 1, an indoor unit is disclosed that includes two heat exchangers arranged vertically, an expansion valve connected between the two heat exchangers, a back-side air outlet through which air passing through the top heat exchanger is blown out, and a front-side air outlet through which air passing through the bottom heat exchanger is blown out. This indoor unit adjusts the opening degree of the expansion valve and blows out air having different temperatures from the back-side air outlet and the front-side air outlet by changing the condensing temperatures of the two heat exchangers at the time of a heating operation. In this case, air having a relatively low temperature is blown out from the front-side air outlet, and air having a relatively high temperature is blown out from the back-side air outlet.

In Patent Literature 2, an indoor unit is disclosed that includes two heat exchangers arranged horizontally, a flow control valve connected to a bifurcation of the two heat exchangers, a first air outlet through which air passing through one of the heat exchangers is blown out, and a second air outlet through which air passing through the other heat exchanger is blown out. This indoor unit adjusts the opening degree of the flow control valve and blows out air having different temperatures from the first air outlet and the second air outlet by changing the flow rates of refrigerant flowing through the respective heat exchangers.

PATENT LITERATURE

Patent Literature 1: Japanese Unexamined Patent Application Publication No. 2018-25344
Patent Literature 2: WO2018/061188

However, the indoor unit described in Patent Literature 1 has a configuration in which the top heat exchanger, the expansion valve, and the bottom heat exchanger are connected in this order. Thus, the indoor unit described in Patent Literature 1 cannot blow out air having a relatively high temperature from the front-side air outlet and air having a relatively low temperature from the back-side air outlet. As a result, the range in which air is separated and blown out is limited, and there is a problem that user's comfortability may decrease.

Moreover, the indoor unit described in Patent Literature 2 needs the flow control valve to realize dual temperature air conditioning. As a result, the cost increases, and the installation space for the heat exchangers is reduced, and therefore there is a problem in that performance may deteriorate.

SUMMARY

The present disclosure has been made in light of the above-described problems of the existing technology. An object of the present disclosure is to provide an air-conditioning apparatus that improves user's comfortability and reduces a decrease in performance.

An air-conditioning apparatus according to an embodiment of the present disclosure includes a casing provided with an air inlet through which air is sucked and an air outlet through which the air is blown out; a plurality of heat exchangers being connected in parallel, and causing heat exchange to be performed between the air sucked from the air inlet and refrigerant; a plurality of fans each sending the air to a corresponding one of the plurality of heat exchangers; and a controller configured to control the plurality of fans so that they have different rotational speeds.

In the air-conditioning apparatus according to an embodiment of the present disclosure, the plurality of fans corresponding to the plurality of respective heat exchangers are controlled so that they have different rotational speeds, and thus air having different temperatures is blown out. As a result, user's comfortability can be improved, and a decrease in performance can be reduced.

DETAILED DESCRIPTION

Figure 1:
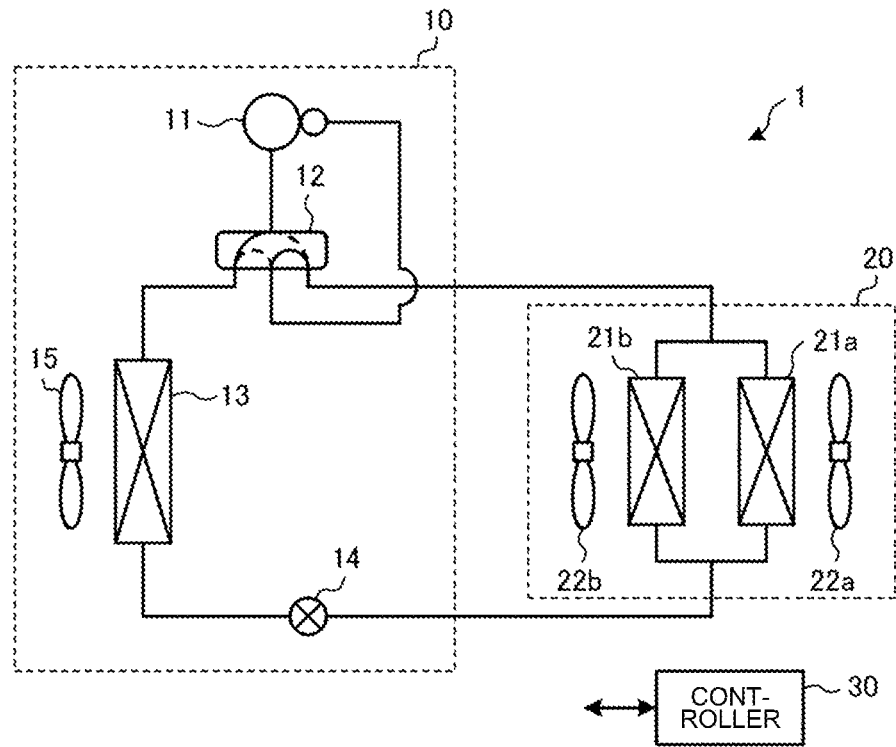
FIG. 1 is a circuit diagram illustrating an example of the configuration of an air-conditioning apparatus according to Embodiment 1.

In the following, embodiments of the present disclosure will be described with reference to the drawings. The present disclosure is not limited to the embodiments below, and various changes can be made without departing from the gist of the present disclosure. Moreover, the present disclosure includes all combinations that can be made from configurations illustrated in each of the embodiments below. Moreover, in the configuration illustrated in each drawing, for example, its shape, size, and arrangement can be changed as appropriate within the scope of the present disclosure. In each drawing, items denoted by the same reference numerals are identical or substantially identical, and this applies to the entire description of the present specification. Moreover, high and low in, for example, temperature and pressure are not particularly determined by relationships based on specific values and are relatively determined in accordance with, for example, a state or an operation in a system, a device, or the like.

Embodiment 1

An air-conditioning apparatus according to Embodiment 1 will be described. The air-conditioning apparatus according to Embodiment 1 is an air-conditioning apparatus that performs air-conditioning of a target space by causing a refrigerant circuit to circulate refrigerant.

[Configuration of Air-Conditioning Apparatus 1]

FIG. 1 is a circuit diagram illustrating an example of the configuration of an air-conditioning apparatus according to Embodiment 1. As illustrated in FIG. 1, an air-conditioning apparatus 1 includes an outdoor unit 10, an indoor unit 20, and a controller 30. The outdoor unit 10 and the indoor unit 20 are connected by refrigerant pipes.

The outdoor unit 10 includes a compressor 11, a refrigerant flow switching device 12, an outdoor heat exchanger 13, an expansion valve 14, and an outdoor fan 15. The indoor unit 20 includes indoor heat exchangers 21a and 21b and indoor fans 22a and 22b. In the air-conditioning apparatus 1, the compressor 11, the refrigerant flow switching device 12, the outdoor heat exchanger 13, the expansion valve 14, and the indoor heat exchangers 21a and 21b are connected by refrigerant pipes in this order to form a refrigerant circuit in which refrigerant circulates.

(Outdoor Unit 10)

The compressor 11 sucks low-temperature and low-pressure refrigerant and compresses the sucked refrigerant to discharge high-temperature and high-pressure refrigerant. The compressor 11 includes an inverter compressor whose capacity, namely, an output amount per unit time is controlled by changing its operation frequency. The operation frequency of the compressor 11 is controlled by the controller 30.

The refrigerant flow switching device 12 is, for example, a four-way valve, and switches between a cooling operation and a heating operation by switching the direction in which refrigerant flows. At the time of the cooling operation, the refrigerant flow switching device 12 performs switching such that its state enters a state illustrated by a solid line in FIG. 1, that is, the discharge side of the compressor 11 and the outdoor heat exchanger 13 are connected to each other. At the time of the heating operation, the refrigerant flow switching device 12 performs switching such that its state enters a state illustrated by a broken line in FIG. 1, that is, the suction side of the compressor 11 and the outdoor heat exchanger 13 are connected to each other. Switching of the flow path in the refrigerant flow switching device 12 is controlled by the controller 30.

The outdoor heat exchanger 13 is, for example, a fin-and-tube heat exchanger and causes heat exchange to be performed between outdoor air supplied by the outdoor fan 15 and refrigerant. In the case of the cooling operation, the outdoor heat exchanger 13 functions as a condenser that condenses refrigerant by transferring heat of the refrigerant to outdoor air. In the case of the heating operation, the outdoor heat exchanger 13 functions as an evaporator that evaporates refrigerant and cools outdoor air in the form of evaporation heat.

The outdoor fan 15 is driven by a motor, which is not illustrated, and supplies outdoor air to the outdoor heat exchanger 13. The rotational speed of the outdoor fan 15 is controlled by the controller 30. By controlling the rotational speed, the amount of air to be sent to the outdoor heat exchanger 13 is adjusted.

The expansion valve 14 decompresses and expands refrigerant. The expansion valve 14 includes, for example, a valve whose opening degree can be controlled. The expansion valve is an electronic expansion valve, for example. The opening degree of the expansion valve 14 is controlled by the controller 30.

(Indoor Unit 20)

The indoor heat exchanger 21a causes heat exchange to be performed between indoor air supplied by the indoor fan 22a and refrigerant, and the indoor heat exchanger 21b causes heat exchange to be performed between indoor air supplied by the indoor fan 22b and refrigerant. As a result, air for cooling or air for heating to be supplied to the indoor space is generated. At the time of the cooling operation, the indoor heat exchangers 21a and 21b function as an evaporator and perform cooling by cooling air in an air-conditioning target space. At the time of the heating operation, the indoor heat exchangers 21a and 21b function as a condenser and perform heating by heating air in the air-conditioning target space. In Embodiment 1, the indoor heat exchangers 21a and 21b are connected in parallel.

The indoor fans 22a and 22b are driven by motors, which are not illustrated, and supply air to the indoor heat exchangers 21a and 21b, respectively. The rotational speeds of the indoor fans 22a and 22b are controlled by the controller 30. By controlling the rotational speeds, the amounts of air to the indoor heat exchangers 21a and 21b are adjusted. Note that, in this example, the two indoor heat exchangers 21a and 21b and the two indoor fans 22a and 22b corresponding to these heat exchangers are provided; however, the number of heat exchangers and that of indoor fans are not limited to two and may each be three or more.

(Controller 30)

The controller 30 controls individual units provided in the outdoor unit 10 and the indoor unit 20. In particular, in Embodiment 1, the controller 30 controls the indoor fans 22a and 22b so that they have different rotational speeds such that the air volumes to the indoor heat exchangers 21a and 21b are made different from each other.

[Structure of Indoor Unit 20]

Figure 2:
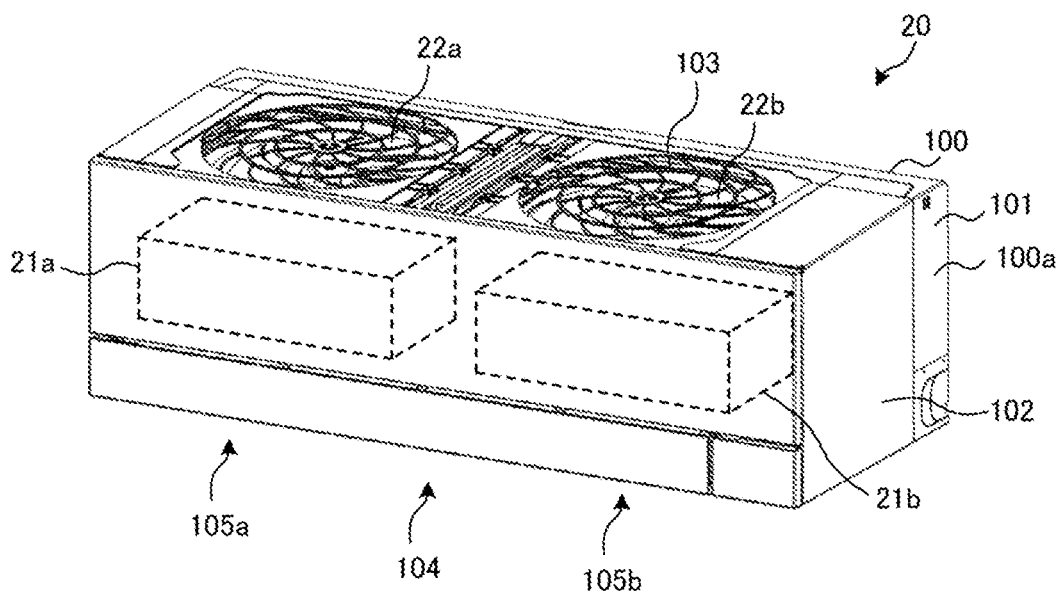
FIG. 2 is a perspective view illustrating an example of the exterior of an indoor unit of the air-conditioning apparatus according to Embodiment 1.
Figure 3:
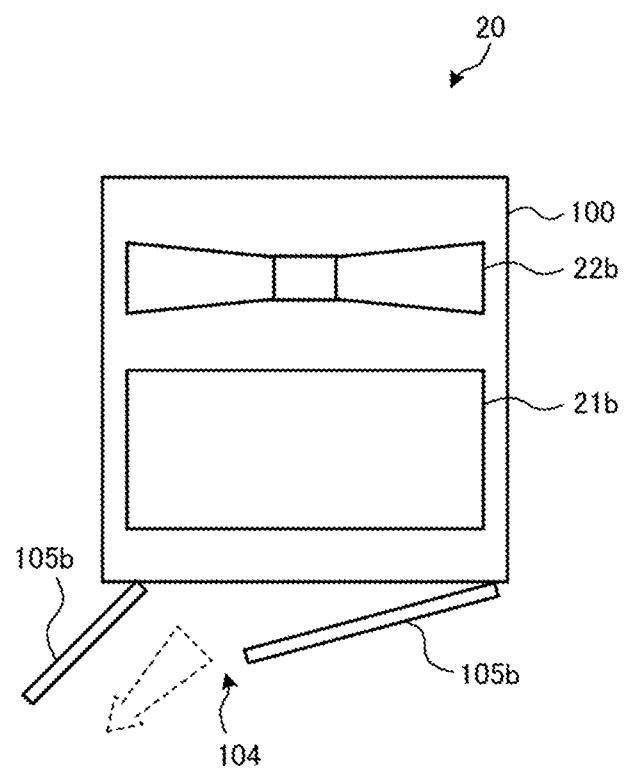
FIG. 3 is a side view schematically illustrating an internal structure of the indoor unit according to Embodiment 1.

FIG. 2 is a perspective view illustrating an example of the exterior of the indoor unit of the air-conditioning apparatus according to Embodiment 1. FIG. 3 is a side view schematically illustrating an internal structure of the indoor unit according to Embodiment 1. Note that, in FIG. 2, portions indicated by broken lines represent the indoor heat exchangers 21a and 21b provided inside the indoor unit 20. Moreover, expressions such as "top", "bottom", "left", "right", "front", and "back" to be used in the following description are referred to as directions for a case where the indoor unit 20 is viewed from the front side, unless otherwise specified.

As illustrated in FIGS. 2 and 3, the indoor unit 20 has a casing 100 and the two indoor heat exchangers 21a and 21b and the two indoor fans 22a and 22b arranged in the casing 100, and is installed in the air-conditioning target space.

The casing 100 of the indoor unit 20 has a base 101 fixed to an indoor wall surface and a design panel 102 attached to the front surface of the base 101. In the top side of the design panel 102, an air inlet 103 is formed through which indoor air is sucked into the indoor unit 20. In the bottom side of the design panel 102, an air outlet 104 is formed through which air is blown out into the indoor space.

The indoor heat exchangers 21a and 21b and the indoor fans 22a and 22b are provided inside the casing 100. The indoor heat exchangers 21a and 21b are arranged in parallel in a left-right direction. The indoor fans 22a and 22b are arranged in parallel to correspond to the indoor heat exchangers 21a and 21b, respectively. Moreover, the motors, which are not illustrated, for driving the indoor fans 22a and 22b in a respective manner are provided inside the casing 100.

Note that the arrangements of the indoor heat exchangers 21a and 21b and the indoor fans 22a and 22b are not limited to this example. As long as an indoor fan corresponding to one indoor heat exchanger can supply air to the indoor heat exchanger, the indoor heat exchangers 21a and 21b and the indoor fans 22a and 22b may be arranged in any manner.

The air outlet 104 is provided with a pair of flaps 105a and 105b, which is openable-closable. The flaps 105a and 105b open and close the air outlet 104 and serve as an up-down air flow deflector that adjusts the direction of blown-out air in the up-down direction. The flaps 105a and 105b are, for example, plate-like components whose left-right directions correspond to their longitudinal directions, and are arranged on the left and the right of the air outlet 104. The flap 105a is arranged on the left of the air outlet 104, and the flap 105b is arranged on the right of the air outlet 104. Note that the air outlet 104 also has a left-right air flow deflector (not illustrated) that adjusts the direction of blown-out air in the left-right direction. The left-right air flow deflector is divided and arranged on the left and the right of the air outlet 104.

The indoor heat exchangers 21a and 21b include, for example, fin-and-tube heat exchangers including a plurality of fins arranged to be spaced apart from each other and a plurality of heat transfer pipes that penetrate through a plurality of fins and along which refrigerant passes. The indoor heat exchangers 21a and 21b are not limited to these heat exchangers and may be so-called finless heat exchangers in which a fin is not provided.

The indoor fans 22a and 22b are arranged downstream of the air inlet 103 and upstream of the indoor heat exchangers 21a and 21b, and include, for example, propeller fans or cross flow fans.

In the indoor unit 20 configured in this manner, a right-side air flow path and a left-side air flow path are mainly formed as air flow paths from the air inlet 103 to the air outlet 104 inside the casing 100. In the left-side air flow path, the indoor heat exchanger 21a and the indoor fan 22a are arranged. In the right-side air flow path, the indoor heat exchanger 21b and the indoor fan 22b are arranged.

Thus, air sucked by the indoor fan 22a through the air inlet 103 flows along the left-side air flow path. Air from the indoor fan 22a passes through the indoor heat exchanger 21a, and the direction of the air is controlled by the flap 105a and the left-right air flow deflector (not illustrated) and is blown out from the air outlet 104. Note that, in the following description, there may be a case where "air that flows along the left-side air flow path, passes through the indoor heat exchanger 21a, and is then blown out" is referred to as "left-side air".

Air sucked by the indoor fan 22b through the air inlet 103 flows along the right-side air flow path. Air from the indoor fan 22b passes through the indoor heat exchanger 21b, and the direction of the air is controlled by the flap 105b and the left-right air flow deflector (not illustrated) and is blown out from the air outlet 104. Note that, in the following description, there may be a case where "air that flows along the right-side air flow path, passes through the indoor heat exchanger 21b, and is then blown out" is referred to as "right-side air".

[Operation of Air-Conditioning Apparatus 1]

Next, the operation of the air-conditioning apparatus 1 configured in this manner will be described in accordance with the flow of refrigerant and with reference to FIG. 1. In the following, the flow of refrigerant will be described for cases where the air-conditioning apparatus 1 performs the cooling operation and the heating operation.

(At Time of Cooling Operation)

A case will be described where the air-conditioning apparatus 1 performs the cooling operation. In a case where the cooling operation is performed, first, the refrigerant flow switching device 12 switches the state to a state illustrated with the solid line in FIG. 1 under control performed by the controller 30. That is, the refrigerant flow switching device 12 performs switching such that the discharge side of the compressor 11 is connected to the outdoor heat exchanger 13, and the suction side of the compressor 11 is connected to the indoor heat exchangers 21a and 21b.

When the compressor 11 is driven, high-temperature and high-pressure gas refrigerant is discharged from the compressor 11. The high-temperature and high-pressure gas refrigerant discharged from the compressor 11 flows into the outdoor heat exchanger 13 functioning as a condenser via the refrigerant flow switching device 12.

The outdoor heat exchanger 13 performs heat exchange to be performed between the high-temperature and high-pressure gas refrigerant having flowed thereinto and outdoor air supplied by the outdoor fan 15. As a result, the high-temperature and high-pressure gas refrigerant condenses to high-pressure liquid refrigerant.

The high-pressure liquid refrigerant having flowed out from the outdoor heat exchanger 13 is expanded by the expansion valve 14 and becomes two-phase refrigerant in which low-pressure gas refrigerant and low-pressure liquid refrigerant are mixed. The two-phase refrigerant flows into each of the indoor heat exchangers 21a and 21b functioning as an evaporator. The indoor heat exchanger 21a exchanges heat between the two-phase refrigerant having flowed thereinto and indoor air supplied by the indoor fan 22a. The indoor heat exchanger 21b exchanges heat between the two-phase refrigerant having flowed thereinto and indoor air supplied by the indoor fan 22b. As a result, the liquid refrigerant out of the two-phase refrigerant evaporates, resulting in low-pressure gas refrigerant.

The low-pressure gas refrigerant having flowed out from the indoor heat exchangers 21a and 21b flows into the compressor 11 via the refrigerant flow switching device 12 and is compressed, resulting in high-temperature and high-pressure gas refrigerant. The high-temperature and high-pressure gas refrigerant is discharged again from the compressor 11. After that, this cycle will be repeated.

(At Time of Heating Operation)

A case will be described where the air-conditioning apparatus 1 performs the heating operation. In a case where the heating operation is performed, first, the refrigerant flow switching device 12 switches the state to a state illustrated with the broken line in FIG. 1 under control performed by the controller 30. That is, the refrigerant flow switching device 12 performs switching such that the discharge side of the compressor 11 is connected to the indoor heat exchangers 21a and 21b, and the suction side of the compressor 11 is connected to the outdoor heat exchanger 13.

When the compressor 11 is driven, high-temperature and high-pressure gas refrigerant is discharged from the compressor 11. The high-temperature and high-pressure gas refrigerant discharged from the compressor 11 flows into each of the indoor heat exchangers 21a and 21b functioning as a condenser via the refrigerant flow switching device 12. The indoor heat exchanger 21a exchanges heat between the high-temperature and high-pressure gas refrigerant having flowed thereinto and indoor air supplied by the indoor fan 22a. The indoor heat exchanger 21b exchanges heat between the high-temperature and high-pressure gas refrigerant having flowed thereinto and indoor air supplied by the indoor fan 22b. As a result, the high-temperature and high-pressure gas refrigerant condenses to high-pressure liquid refrigerant.

The high-pressure liquid refrigerant having flowed out from the indoor heat exchangers 21a and 21b is expanded by the expansion valve 14 and is turned into two-phase refrigerant in which low-pressure gas refrigerant and low-pressure liquid refrigerant are mixed. The two-phase refrigerant flows into the outdoor heat exchanger 13 functioning as an evaporator. The outdoor heat exchanger 13 causes heat exchange to be performed between the two-phase refrigerant having flowed thereinto and outdoor air supplied by the outdoor fan 15. As a result, the liquid refrigerant out of the two-phase refrigerant evaporates, resulting in low-pressure gas refrigerant. The low-pressure gas refrigerant having flowed out from the outdoor heat exchanger 13 flows into the compressor 11 via the refrigerant flow switching device 12 and is compressed, resulting in high-temperature and high-pressure gas refrigerant. The high-temperature and high-pressure gas refrigerant is discharged again from the compressor 11. After that, this cycle will be repeated.

[Dual Temperature Air Conditioning]

Next, dual temperature air conditioning performed by the air-conditioning apparatus 1 according to Embodiment 1 will be described. The air-conditioning apparatus 1 according to Embodiment 1 performs dual temperature air conditioning so that the temperatures of air to be blown out from the two indoor heat exchangers 21a and 21b of the indoor unit 20 are made different from each other. In the following, a method for calculating the temperature of air to be blown out from the indoor unit 20 of the air-conditioning apparatus 1 and a method for calculating a to-be-blown-out air temperature for dual temperature air conditioning will be described.

(Calculation of to-be-Blown-Out Air Temperature)

In general, a to-be-blown-out air temperature of air to be blown out from the indoor unit of an air-conditioning apparatus is calculated on the basis of an intake air temperature $T_{airin}$, the performance of an indoor heat exchanger, and the air volume to the indoor heat exchanger. Specifically, a to-be-blown-out air temperature $T_{airout}$ is calculated on the basis of Eqs. (1) and (2). Eq. (1) expresses an arithmetic expression of the to-be-blown-out air temperature $T_{airout}$ for a case where a cooling operation is performed. Eq. (2) expresses an arithmetic expression of the to-be-blown-out air temperature $T_{airout}$ for a case where a heating operation is performed. Note that, in Eqs. (1) and (2), "$Q_c$" denotes the performance of the indoor heat exchanger at the time of the cooling operation, "$Q_h$" denotes the performance of the indoor heat exchanger at the time of the heating operation, "Ga" denotes the air volume to the indoor heat exchanger (air mass flow), and Cp denotes the specific heat of air.

$$T_{airout} = T_{airin} - Q_c/(Ga \times Cp) \tag{1}$$

$$T_{airout} = T_{airin} + Q_h/(Ga \times Cp) \tag{2}$$

As expressed by Eqs. (1) and (2), the to-be-blown-out air temperature $T_{airout}$ changes when the air volume Ga changes. In this case, the air volume Ga changes when the rotational speed of the fan is changed. That is, the to-be-blown-out air temperature $T_{airout}$ changes when the rotational speed of the fan is changed. In contrast, the to-be-blown-out air temperature $T_{airout}$ changes when the performances $Q_c$ and $Q_h$ change. In this case, the performances $Q_c$ and $Q_h$ change as the air volume Ga changes.

As described above, the to-be-blown-out air temperature $T_{airout}$ changes when the rotational speed of the fan is changed to change the air volume Ga.

(Calculation of to-be-Blown-Out Air Temperature for Dual Temperature Air Conditioning)

Next, for dual temperature air conditioning performed by the indoor unit 20 of the air-conditioning apparatus 1 according to Embodiment 1, a method for calculating a to-be-blown-out air temperature will be described. Dual temperature air conditioning is air conditioning in which one indoor unit is caused to blow out air having two different temperatures. The air-conditioning apparatus 1 according to Embodiment 1 performs dual temperature air conditioning by making the temperatures of to-be-blown-out air different from each other, the air having passed though the two respective indoor heat exchangers 21a and 21b provided in the indoor unit 20.

Thus, in a case where the indoor unit 20 performs dual temperature air conditioning, to-be-blown-out air temperatures of air are calculated as follows, the air having passed through the two respective indoor heat exchangers 21a and 21b and being to be blown out from the indoor unit 20. Note that the performances of the indoor heat exchangers generally differ between at the time of the cooling operation and at the time of the heating operation, and thus the to-be-blown-out air temperatures are calculated using different arithmetic expressions in accordance with the operation state.

In a case where the to-be-blown-out air temperature of the indoor heat exchanger 21a is denoted by "$T_{airout1}$", the to-be-blown-out air temperature $T_{airout1}$ at the time of the cooling operation is expressed as Eq. (3) based on Eq. (1). In a case where the to-be-blown-out air temperature of the indoor heat exchanger 21b is denoted by "$T_{airout2}$", the to-be-blown-out air temperature $T_{airout2}$ at the time of the cooling operation is expressed as Eq. (4) based on Eq. (1).

Note that "1" attached to each parameter in Eq. (3) indicates that the parameter corresponds to the indoor heat exchanger 21a, and "2" attached to each parameter in Eq. (4) indicates that the parameter corresponds to the indoor heat exchanger 21b.

$$T_{airout1} = T_{airin1} - Q_{c1}/(Ga_1 \times Cp_1) \quad (3)$$

$$T_{airout2} = T_{airin2} - Q_{c2}/(Ga_2 \times Cp_2) \quad (4)$$

The to-be-blown-out air temperature $T_{airout1}$ of the indoor heat exchanger 21a at the time of the heating operation is expressed as Eq. (5) based on Eq. (2). The to-be-blown-out air temperature $T_{airout2}$ of the indoor heat exchanger 21b at the time of the heating operation is expressed as Eq. (6) based on Eq. (2).

$$T_{airout1} = T_{airin1} Q_{h1}/(Ga_1 \times Cp_1) \quad (5)$$

$$T_{airout2} = T_{airin2} Q_{h2}/(Ga_2 \times Cp_2) \quad (6)$$

As expressed by Eqs. (3) to (6), each to-be-blown-out air temperature $T_{airout}$ is determined by increasing or decreasing the corresponding air-inlet temperature $T_{airin}$ by a value obtained on the basis of performance, air volume, and specific heat. Thus, in a case where dual temperature air conditioning is performed to blow out air having two different temperatures, it is sufficient that values obtained on the basis of performance, air volume, and specific heat be made different from each other. Specifically, the controller 30 controls the rotational speeds of the indoor fans 22a and 22b such that values obtained on the basis of the performances, the air volumes, and the specific heats of the indoor heat exchangers 21a and 21b are different from each other.

Figure 4:
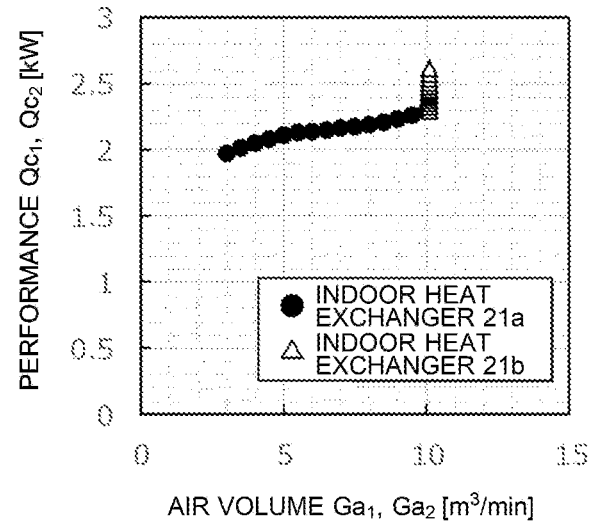
FIG. 4 is a graph illustrating an example of the relationships between the air volumes and the performances of indoor heat exchangers at the time of a cooling operation.
Figure 5:
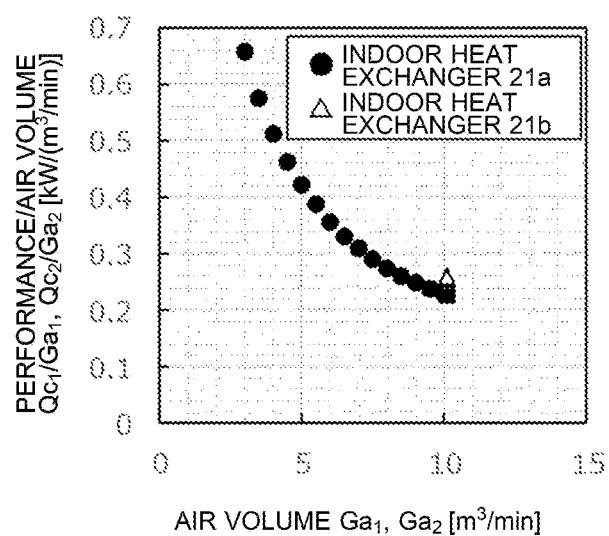
FIG. 5 is a graph illustrating an example of the relationship between the air volume and the (performance/air volume) of each indoor heat exchanger at the time of the cooling operation.
Figure 6:
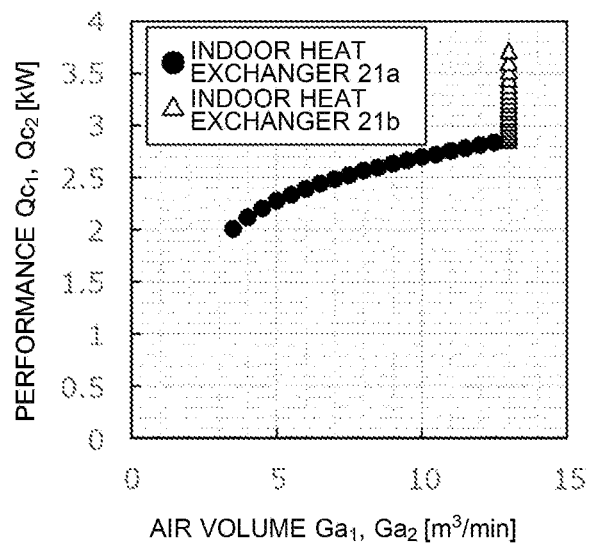
FIG. 6 is a graph illustrating an example of the relationship between the air volume and the performance of each indoor heat exchanger at the time of a heating operation.
Figure 7:
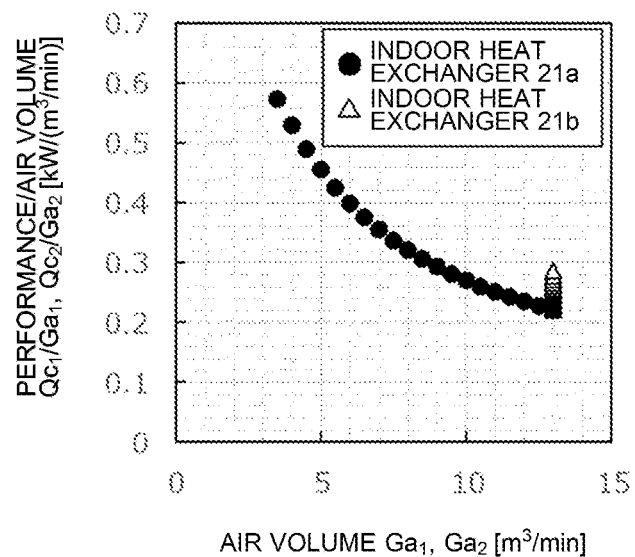
FIG. 7 is a graph illustrating an example of the relationship between the air volume and the (performance/air volume) of each indoor heat exchanger at the time of the heating operation.

FIG. 4 is a graph illustrating an example of the relationship between the air volume and the performance of each indoor heat exchanger at the time of the cooling operation. FIG. 5 is a graph illustrating an example of the relationship between the air volume and the (performance/air volume) of each indoor heat exchanger at the time of the cooling operation. FIG. 6 is a graph illustrating an example of the relationship between the air volume and the performance of each indoor heat exchanger at the time of the heating operation. FIG. 7 is a graph illustrating an example of the relationship between the air volume and the (performance/air volume) of each indoor heat exchanger at the time of the heating operation.

In FIGS. 4 and 6, the horizontal axis represents air volumes $Ga_1$ and $Ga_2$ [m³/min] of the respective indoor heat exchangers 21a and 21b, and the vertical axis represents performances $Q_{c1}$ and $Q_{c2}$ [kW] of the respective indoor heat exchangers 21a and 21b. In FIGS. 5 and 7, the horizontal axis represents the air volumes $Ga_1$ and $Ga_2$ [m³/min] of the respective indoor heat exchangers 21a and 21b, and the vertical axis represents $Q_{c1}/Ga_1$ and $Q_{c2}/Ga_2$ [kW/(m³/min)] each of which is the (performance/air volume) of a corresponding one of the indoor heat exchangers 21a and 21b.

In the examples illustrated in FIGS. 4 to 7, for brevity, a case will be described in which the total performance of the indoor heat exchangers 21a and 21b is constant, and the air volume $Ga_2$ of the indoor heat exchanger 21b is fixed. Note that in a case where one out of the air volumes $Ga_1$ and $Ga_2$ of the indoor heat exchangers 21a and 21b is fixed in this manner, dual temperature air conditioning is performed by controlling only the air volume of one of the indoor heat exchangers. Thus, the air volume can be easily controlled at the time of dual temperature air conditioning, and this is preferable.

At the time of the cooling operation, as illustrated in FIG. 4, when the air volume $Ga_1$ of the indoor heat exchanger 21a decreases, the performance $Q_{c1}$ decreases. In this case, the performance $Q_{c2}$ of the indoor heat exchanger 21b increases even in a state where the air volume Gat is fixed. This is because a refrigerant flow rate for the indoor heat exchanger 21b increases due to a change in the air volume $Ga_1$ $Ga_1$ of the indoor heat exchanger 21a.

Specifically, in a case where the air volume $Ga_1$ supplied from the indoor fan 22a decreases, the heat exchange amount of the indoor heat exchanger 21a decreases. When the heat exchange amount of the indoor heat exchanger 21a decreases, the state of refrigerant at the outlet of the indoor heat exchanger 21a changes such as the degree of subcooling or the degree of superheat of refrigerant flowing through the outlet.

In this case, presuming that the states of refrigerant at the inlets of the indoor heat exchangers 21a and 21b are the same, the state of refrigerant at the outlet of the indoor unit 20 changes, and thus the pressure loss of refrigerant flowing in the indoor heat exchangers 21a and 21b momentarily changes. When the pressure loss of refrigerant changes, refrigerant flows in the indoor unit 20 such that the pressure loss at the inlet and that at the outlet become equal.

As a result, the flow rates of refrigerant flowing in the indoor heat exchangers 21a and 21b change, and the heat exchange amount changes even in the indoor heat exchanger 21b, for which the air volume is fixed. Thus, in a case where the air volume $Ga_1$ of the indoor heat exchanger 21a decreases at the time of the cooling operation, the performance $Q_{c1}$ of the indoor heat exchanger 21a decreases, and the performance $Q_{c2}$ of the indoor heat exchanger 21b increases.

As illustrated in FIG. 5, when the air volume $Ga_1$ of the indoor heat exchanger 21a decreases, $Q_{c1}/Ga_1$, which is the (performance/air volume) of the indoor heat exchanger 21a, increases. In contrast, $Q_{c2}/Ga_2$, which is the (performance/air volume) of the indoor heat exchanger 21b, hardly changes.

That is, when the air volume decreases at the time of the cooling operation, the performance and the (performance/air volume) increase. Thus, in a case where a to-be-blown-out air temperature is to be reduced at the time of the cooling operation, it is sufficient that control be performed such that the (performance/air volume) increases on the basis of Eqs. (3) and (4). Thus, it is sufficient that the rotational speed of the indoor fan be reduced such that the air volume decreases.

At the time of the heating operation, similarly to as at the time of the cooling operation, when the air volume $Ga_1$ of the indoor heat exchanger 21a decreases, the performance $Q_{c1}$ decreases as illustrated in FIG. 6. In this case, the performance $Q_{c2}$ of the indoor heat exchanger 21b increases even in the state in which the air volume $Ga_2$ is fixed.

As illustrated in FIG. 7, when the air volume $Ga_1$ of the indoor heat exchanger 21a decreases, $Q_{c1}/Ga_1$, which is the (performance/air volume) of the indoor heat exchanger 21a, increases. In contrast, $Q_{c2}/Ga_2$, which is the (performance/air volume) of the indoor heat exchanger 21b, slightly increases when the air volume $Ga_2$ of the indoor heat exchanger 21b decreases; however, the amount of an increase in $Q_{c2}/Ga_2$ is not as large as that in $Q_{c1}/Ga_1$, which is the (performance/air volume) of the indoor heat exchanger 21a.

That is, at the time of the heating operation, similarly to as at the time of the cooling operation, when the air volume decreases, the performance and the (performance/air volume) increase. Thus, in a case where a to-be-blown-out air temperature is to be increased at the time of the heating operation, it is sufficient that control be performed such that the (performance/air volume) increases on the basis of Eqs. (5) and (6). Thus, it is sufficient that the rotational speed of the indoor fan be reduced such that the air volume decreases.

Next, a specific example of dual temperature air conditioning will be described. In this case, for example, a case will be considered where the air volumes $Ga_1$ and $Ga_2$ to the indoor heat exchangers 21a and 21b are determined in the cooling operation such that the relationship between the to-be-blown-out air temperature $T_{airout1}$ of left-side air and the to-be-blown-out air temperature $T_{airout2}$ of right-side air becomes "$T_{airout1} < T_{airout2}$".

In this case, each parameter in Eqs. (3) and (4) is determined such that "$T_{airout1} < T_{airout2}$" is satisfied. In Eqs. (3) and (4), the air-inlet temperatures $T_{airin1}$ and $T_{airin2}$ are the temperatures of air sucked from the same air inlet 103, and thus the air-inlet temperatures $T_{airin1}$ and $T_{airin2}$ can be treated as the same value. In addition, similarly, specific heats $C_{p1}$ and $C_{p2}$ can also be treated as substantially the same value.

Thus, to achieve "$T_{airout1} < T_{airout2}$" at the time of the cooling operation, the relationship expressed by Eq. (7) is derived on the basis of Eqs. (3) and (4).

$$Q_{c1}/Ga_1 > Q_{c2}/Ga_2 \quad (7)$$

In this case, it is clear from FIG. 4 that the relationship expressed by Eq. (7) is satisfied when the air volume $Ga_1$ of the indoor heat exchanger 21a is smaller than that for a case where the air volumes $Ga_1$ and $Ga_2$ to the two indoor heat exchangers 21a and 21b become equal. In contrast, in this example, the air volume $Ga_2$ to the indoor heat exchanger 21b is fixed. Thus, it is sufficient that the air volume $Ga_1$ of the indoor heat exchanger 21a be smaller than the air volume $Ga_2$ of the indoor heat exchanger 21b. Thus, to satisfy "$T_{airout1} < T_{airout2}$" at the time of the cooling operation, it is sufficient that the controller 30 control the rotational speeds of the indoor fans 22a and 22b such that "$Ga_1 < Ga_2$" is satisfied.

Note that in a case where the rotational speeds of the indoor fans 22a and 22b are controlled to satisfy "$T_{airout1} < T_{airout2}$", the air volume $Ga_2$ on the left side where the temperature is relatively low is smaller than the air volume $Ga_1$ on the right side where the temperature is relatively high. Thus, it is preferable that the controller 30 shrink the air by controlling the left flap 105a of the air outlet 104 to increase the speed of the air flow. This is performed to cause cold and powerful air to reach a user.

As described above, in the air-conditioning apparatus 1 according to Embodiment 1, air having different temperatures is blown out by controlling the indoor fans 22a and 22b corresponding to the respective indoor heat exchangers 21a and 21b so that the indoor fans 22a and 22b have different rotational speeds. Thus, user's comfortability is improved, and also a decrease in performance can be reduced.

Hitherto, it has been necessary to provide a flow control valve at a bifurcation portion of a plurality of indoor heat exchangers connected in parallel to achieve dual temperature air conditioning; however, a flow control valve is not needed in the air-conditioning apparatus 1 according to Embodiment 1. Thus, dual temperature air conditioning can be appropriately achieved while reducing cost.

Moreover, in this case, in a case where differences between the surface temperatures of a plurality of persons present in the air-conditioning target space include a surface temperature difference of 1 degree C. or more, it is preferable that the rotational speeds of the indoor fans 22a and 22b be controlled in the air-conditioning apparatus 1 so that the volume of air to be blown out from the air outlet 104 is made uneven. Furthermore, in this case, it is preferable that the rotational speeds of the indoor fans 22a and 22b be controlled such that the air volume ratio becomes less than or equal to 0.8.

In the air-conditioning apparatus 1, the rotational speed of one of the indoor fans 22a and 22b is fixed. As a result, dual temperature air conditioning is performed by controlling only the air volume of one of the indoor heat exchangers, and thus the air volumes can be easily controlled at the time of dual temperature air conditioning.

Embodiment 2

Next, Embodiment 2 will be described. In Embodiment 2, a case will be described in which the dual temperature air conditioning described in Embodiment 1 is automatically performed in accordance with the state of an air-conditioning target space. Note that, in Embodiment 2, parts common to those in Embodiment 1 will be denoted by the same reference numerals, and detailed description will be omitted.

[Structure of Indoor Unit 20]

Figure 8:
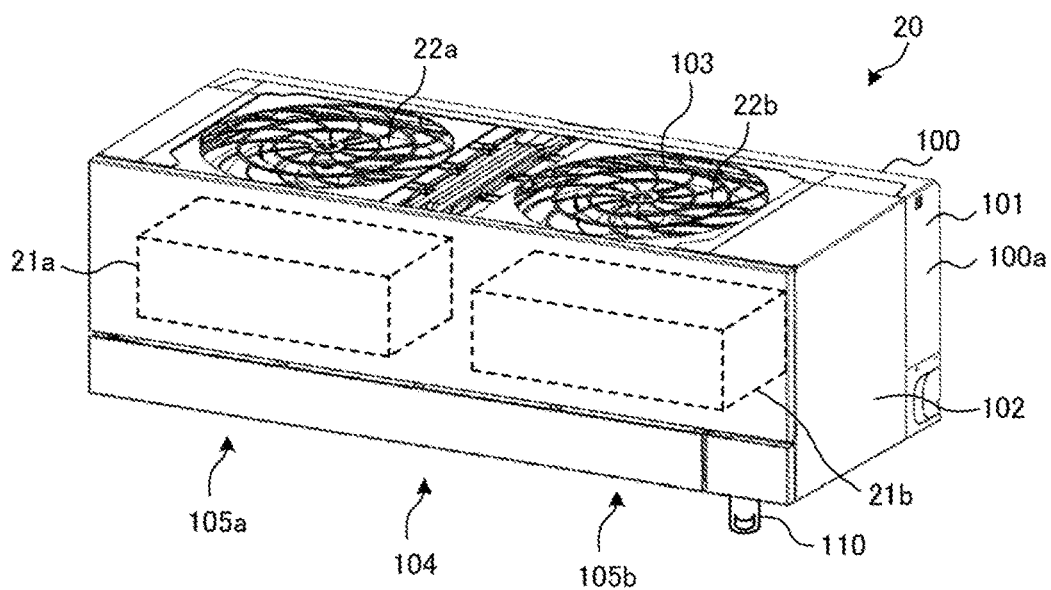
FIG. 8 is a perspective view illustrating an example of the exterior of an indoor unit of an air-conditioning apparatus according to Embodiment 2.

FIG. 8 is a perspective view illustrating an example of the exterior of an indoor unit of an air-conditioning apparatus according to Embodiment 2. Note that, in FIG. 8, portions indicated by broken lines represent the indoor heat exchangers 21a and 21b provided inside the indoor unit 20.

As illustrated in FIG. 8, similarly to as in Embodiment 1, the indoor unit 20 according to Embodiment 2 has the casing 100 and the two indoor heat exchangers 21a and 21b and the two indoor fans 22a and 22b arranged in the casing 100, and is installed in an air-conditioning target space.

In Embodiment 2, the indoor unit 20 has a space temperature sensor 110. The space temperature sensor 110 is provided, for example, to project from the bottom side of the design panel 102 and is configured to detect the surface temperatures of persons present in the air-conditioning target space. As the space temperature sensor 110, for example, an infrared sensor is used that can detect the temperature distribution of the inside of the air-conditioning target space.

[Configuration of Air-Conditioning Apparatus 1]

On the basis of the surface temperatures of persons detected by the space temperature sensor 110, a controller 30 according to Embodiment 2 controls the indoor fans 22a and 22b so that they have different rotational speeds such that dual temperature air conditioning is performed.

Figure 9:
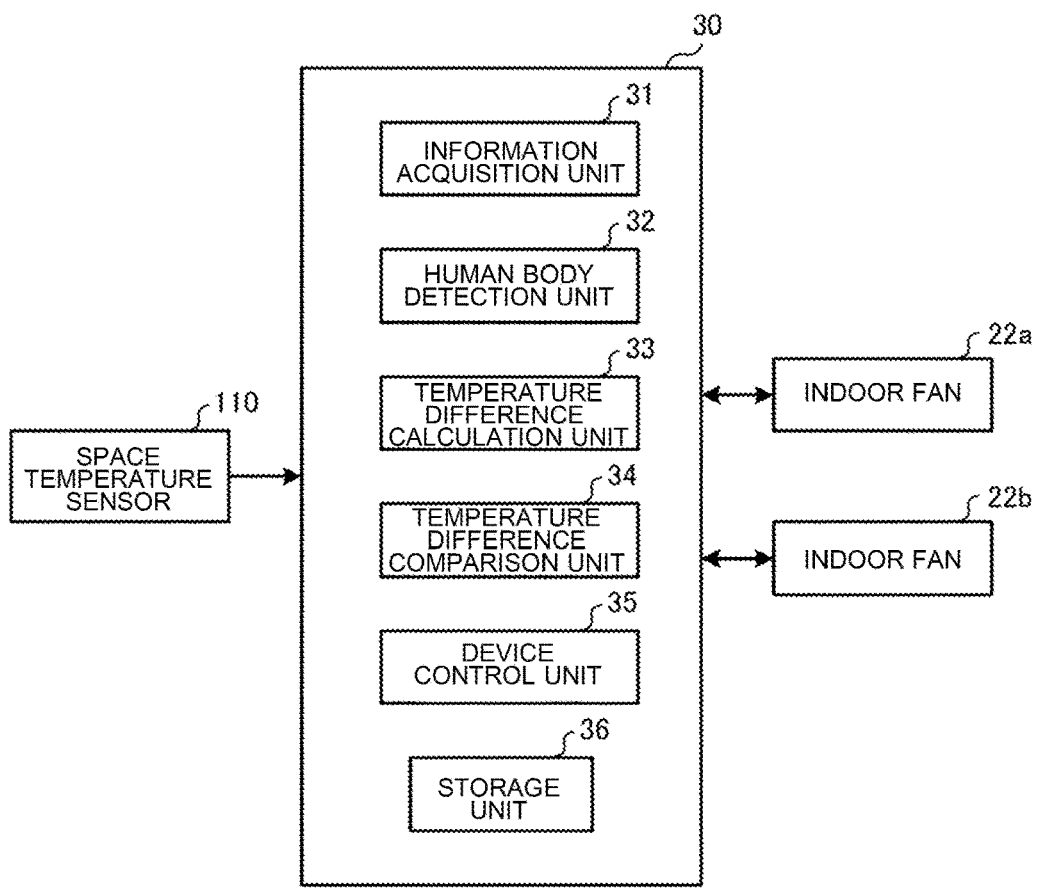
FIG. 9 is a functional block diagram illustrating an example of the configuration of a controller according to Embodiment 2.

FIG. 9 is a functional block diagram illustrating an example of the configuration of the controller according to Embodiment 2. As illustrated in FIG. 9, the controller 30 includes an information acquisition unit 31, a human body detection unit 32, a temperature difference calculation unit 33, a temperature difference comparison unit 34, a device control unit 35, and a storage unit 36. The controller 30 includes, for example, a computing device such as a microcomputer that realizes various functions by executing software, or a hardware device such as a circuit device corresponding to various functions. Note that, in FIG. 9, only configurations for the functions associated with Embodiment 2 are illustrated, and illustration of the other configurations is omitted.

The information acquisition unit 31 acquires a space temperature detected by the space temperature sensor 110. The space temperature represents the temperature of the entire air-conditioning target space. The human body detection unit 32 is configured to detect human beings in the air-conditioning target space on the basis of the space temperature. The human body detection unit 32 is configured to detect human beings using, for example, a method that has hitherto been used. The temperature difference calculation unit 33 calculates the difference between the temperatures of air passing through and blown out from the respective indoor heat exchangers 21a and 21b.

The temperature difference comparison unit 34 compares the temperature difference calculated by the temperature difference calculation unit 33 with a set temperature stored in the storage unit 36. Moreover, the temperature difference comparison unit 34 determines whether the temperature difference is greater than or equal to the set temperature through comparison. The device control unit 35 controls the rotational speeds of the indoor fans 22a and 22b on the basis of the comparison result from the temperature difference comparison unit 34. The storage unit 36 stores various types of information to be used by the individual units of the controller 30. In Embodiment 2, the storage unit 36 stores, in advance, the set temperature used by the temperature difference comparison unit 34.

Figure 10:
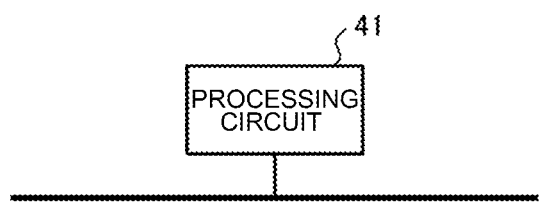
FIG. 10 is a hardware configuration diagram illustrating an example of the configuration of the controller of FIG. 9.

FIG. 10 is a hardware configuration diagram illustrating an example of the configuration of the controller of FIG. 9. In a case where the various functions of the controller 30 are executed by a hardware device, the controller 30 of FIG. 9 is constituted by a processing circuit 41 as illustrated in FIG. 10. In the controller 30 of FIG. 9, the functions of the information acquisition unit 31, the human body detection unit 32, the temperature difference calculation unit 33, the temperature difference comparison unit 34, the device control unit 35, and the storage unit 36 are realized by the processing circuit 41.

In a case where the functions are executed by the hardware device, the processing circuit 41 corresponds to, for example, a single circuit, a composite circuit, a programmed processor, a parallel programmed processor, an application-specific integrated circuit (ASIC), a field-programmable gate array (FPGA), or a combination of some or all of the items above. The controller 30 may realize each of the functions of the information acquisition unit 31, the human body detection unit 32, the temperature difference calculation unit 33, the temperature difference comparison unit 34, the device control unit 35, and the storage unit 36 using a corresponding one of processing circuits 41 or may realize the functions of the individual units using one processing circuit 41.

Figure 11:
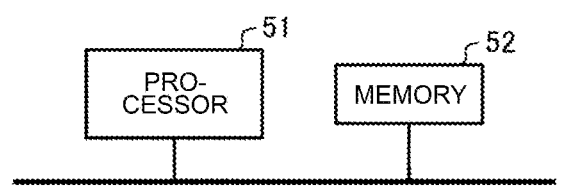
FIG. 11 is a hardware configuration diagram illustrating another example of the configuration of the controller of FIG. 9.

FIG. 11 is a hardware configuration diagram illustrating another example of the configuration of the controller of FIG. 9. In a case where the various functions of the controller 30 are executed by software, the controller 30 of FIG. 9 is constituted by a processor 51 and a memory 52 as illustrated in FIG. 11. In the controller 30, the functions of the information acquisition unit 31, the human body detection unit 32, the temperature difference calculation unit 33, the temperature difference comparison unit 34, the device control unit 35, and the storage unit 36 are realized by the processor 51 and the memory 52.

In a case where the functions are executed by software, the functions of the information acquisition unit 31, the human body detection unit 32, the temperature difference calculation unit 33, the temperature difference comparison unit 34, the device control unit 35, and the storage unit 36 are realized by software, firmware, or a combination of software and firmware in the controller 30. Software and firmware are described as programs and are stored in the memory 52. The processor 51 realizes the functions of the individual units by reading out and executing the program or programs stored in the memory 52.

As the memory 52, for example, a nonvolatile or volatile semiconductor memory such as a random access memory (RAM), a read only memory (ROM), a flash memory, an erasable and programmable ROM (EPROM), and an electrically erasable and programmable ROM (EEPROM) is used. Moreover, as the memory 52, for example, a removable recording medium such as a magnetic disk, a flexible disk, an optical disc, a compact disc (CD), a Mini Disc (MD), and a digital versatile disc (DVD) may be used.

[Dual Temperature Air Conditioning]

Next, dual temperature air conditioning performed by an air-conditioning apparatus 1 according to Embodiment 2 will be described. For example, in a case where a person is already in an air-conditioning target space such as a room, when another person comes into the room from the outside, the person who is already in the air-conditioning target space and the person who has come into the room from the outside have different surface temperatures. Thus, it is conceivable that they desire air having different to-be-blown-out air temperatures. In such a case, when air conditioning is performed at the uniform temperature, one person may feel comfortable but another person may feel uncomfortable.

Thus, in Embodiment 2, dual temperature air conditioning is performed on the basis of the surface temperatures of target persons in an air-conditioning target space to provide, to each person, air having a to-be-blown-out air temperature appropriate for the person.

In this case, in the indoor unit 20, the presence or absence of a person or persons in the air-conditioning target space is detected. In a case where the presence of a plurality of persons is detected in the air-conditioning target space, the surface temperature of each person is detected. In a case where the differences between the surface temperatures of the persons include a surface temperature difference of greater than or equal to a set temperature, dual temperature air conditioning is performed. The set temperature is set to, for example, 1 degree C.

Figure 12:
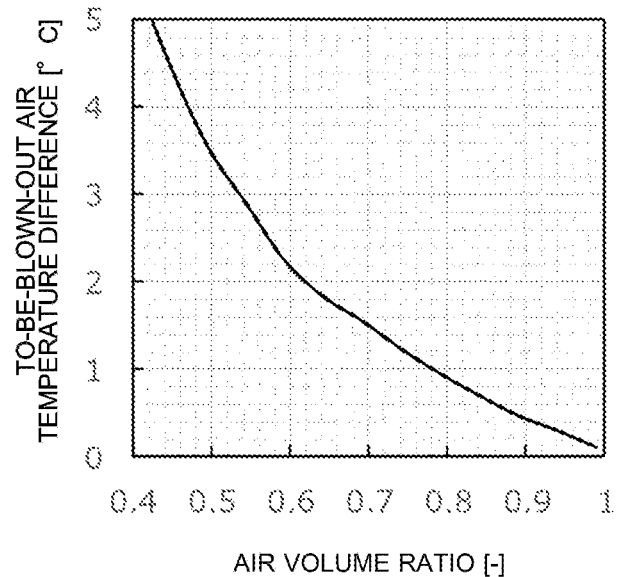
FIG. 12 is a graph illustrating an example of the relationship between the ratio between the air volumes of two indoor heat exchangers and a to-be-blown-out air temperature difference at the time of the cooling operation.
Figure 13:
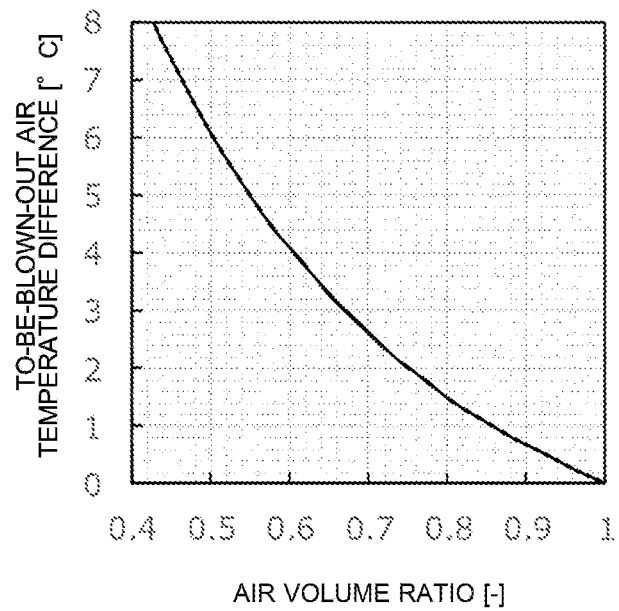
FIG. 13 is a graph illustrating an example of the relationship between the ratio between the air volumes of the two indoor heat exchangers and a to-be-blown-out air temperature difference at the time of the heating operation.

FIG. 12 is a graph illustrating an example of the relationship between the ratio between the air volumes of the two indoor heat exchangers and a to-be-blown-out air temperature difference at the time of the cooling operation. FIG. 13 is a graph illustrating an example of the relationship between the ratio between the air volumes of the two indoor heat exchangers and a to-be-blown-out air temperature difference at the time of the heating operation.

In FIGS. 12 and 13, the horizontal axis represents an air volume ratio [-], which is the ratio between the air volumes of the respective indoor heat exchangers 21a and 21b. The vertical axis represents a to-be-blown-out air temperature difference [° C.] of each of the indoor heat exchangers 21a and 21b. In the examples illustrated in FIGS. 12 and 13, a case is illustrated in which the total performance of the indoor heat exchangers 21a and 21b is constant, and the air volume Gat of the indoor heat exchanger 21b is fixed.

As illustrated in FIGS. 12 and 13, at any one of the time of the cooling operation and the time of the heating operation, when the ratio between the air volumes of the indoor heat exchangers 21a and 21b decreases, the to-be-blown-out air temperature difference increases. Moreover, at any one of the time of the cooling operation and the time of the heating operation, the to-be-blown-out air temperature difference becomes 1 degree C. in a case where the air volume ratio is 0.8.

Thus, for example, in a case where the set temperature is set to 1 degree C. and where the differences between the surface temperatures of the persons present in the air-conditioning target space include a surface temperature difference of greater than or equal to 1 degree C., which is the set temperature, the controller 30 controls the rotational speeds of the indoor fans 22a and 22b such that the air volume ratio becomes less than or equal to 0.8. In this case, the reason why the rotational speeds of the indoor fans 22a and 22b are controlled such that the air volume ratio becomes less than or equal to 0.8 is because it is desired to cause the to-be-blown-out air temperature difference to be between the indoor heat exchangers 21a and 21b to be 1 degree C. or more. The reason why it is desired to cause the to-be-blown-out air temperature difference to be 1 degree C. or more is because it is desired to cause blown-out air having a certain temperature difference to reach the persons.

[Dual Temperature Air Conditioning Processing]

Figure 14:
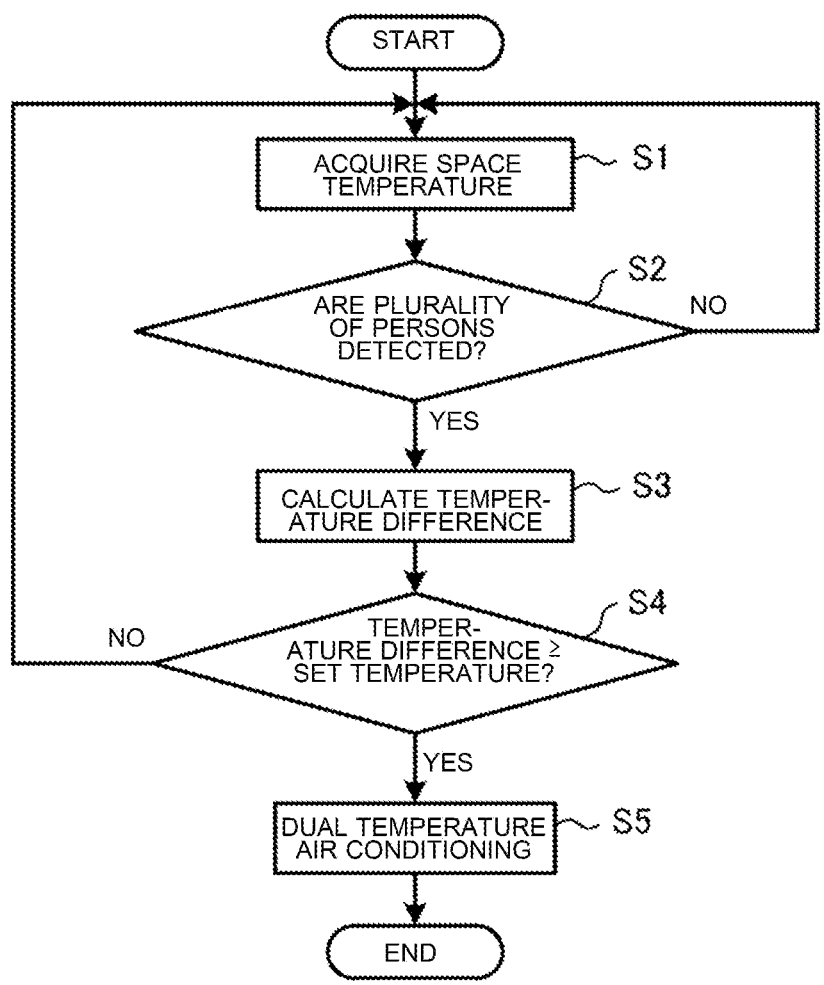
FIG. 14 is a flow chart illustrating an example of the procedure of dual temperature air conditioning processing performed by the indoor unit according to Embodiment 2.

Next, dual temperature air conditioning processing performed by the air-conditioning apparatus 1 according to Embodiment 2 will be described. FIG. 14 is a flow chart illustrating an example of the procedure of dual temperature air conditioning processing performed by the indoor unit according to Embodiment 2. First, in step S1, the information acquisition unit 31 of the controller 30 acquires the space temperature of the air-conditioning target space detected by the space temperature sensor 110.

In step S2, the human body detection unit 32 determines whether or not a plurality of persons are present in the air-conditioning target space on the basis of the space temperature acquired in step S1. In a case where the human body detection unit 32 determines that a plurality of persons are present (step S2: YES), the temperature difference calculation unit 33 calculates a to-be-blown-out air temperature difference in step S3. In contrast, in a case where the human body detection unit 32 determines that a plurality of persons are not present (step S2: NO), the process returns to step S1.

In step S4, the temperature difference comparison unit 34 compares the calculated temperature difference with the set temperature stored in the storage unit 36.

As a result of the comparison, in a case where the temperature difference is greater than or equal to the set temperature (step S4: YES), the device control unit 35 controls the rotational speeds of the indoor fans 22a and 22b and performs dual temperature air conditioning. In contrast, in a case where the temperature difference is less than the set temperature (step S4: NO), the process returns to step S1.

As described above, in the air-conditioning apparatus 1 according to Embodiment 2, the rotational speeds of the indoor fans 22a and 22b are controlled so that the volume of air to be blown out from the air outlet 104 is made uneven on the basis of a space temperature measured by the space temperature sensor 110 configured to detect a space temperature. As a result, air corresponding to each of the temperature states of the plurality of target persons in the air-conditioning target space is blown out. Thus, for each of the plurality of persons, air appropriate for the person can be supplied.

The invention claimed is:

1. An air-conditioning apparatus comprising:
a casing provided with an air inlet through which air is sucked and an air outlet through which the air is blown out;
a plurality of heat exchangers being connected in parallel, and causing heat exchange to be performed between the air sucked from the air inlet and refrigerant;
a plurality of fans, including one fan and an other fan, each sending the air to a corresponding one of the plurality of heat exchangers;
a left-side air flow path, in which air sucked by the one fan through the air inlet and blown out from the air outlet through one of the plurality of heat exchangers flows;
a right-side air flow path, in which air sucked by the other fan through the air inlet and blown out from the air outlet through an other of the plurality of heat exchangers flows; and
a controller configured to control the plurality of fans so that they have different rotational speeds, to thereby perform dual temperature air conditioning in which air having different temperatures is blown out,
wherein the controller is configured to, in a case where a difference between surface temperatures of a plurality of targets present in an air-conditioning target space is 1 degree C. or more, determine that a ratio between air volumes of the plurality of fans is less than or equal to 0.8 when a temperature difference is 1 degree C. or more, based on a graph illustrating a relationship between the ratio between air volumes and the temperature difference when a total performance of the plurality of indoor heat exchangers is constant and the air volume of the other fan is set to a constant value, the temperature difference between a temperature of the air which passes through the left-side air flow path and a temperature of the air which passes through the right-side air flow path, and
wherein the controller is configured to control the rotational speed of each of the plurality of fans such that the ratio between air volumes becomes less than or equal to 0.8.

2. The air-conditioning apparatus of claim 1, further comprising:
a space temperature sensor configured to measure a space temperature,
wherein the controller is configured to control, based on the space temperature measured by the space temperature sensor, the rotational speed of each of the plurality of fans so that a volume of the air to be blown out from the air outlet is made to be unequal.

3. The air-conditioning apparatus of claim 1, further comprising:
a flap provided at the air outlet and configured to control an opening degree of the air outlet.

* * * * *